(12) United States Patent
Yee et al.

(10) Patent No.: US 12,400,072 B2
(45) Date of Patent: Aug. 26, 2025

(54) SYSTEMS AND METHODS FOR STRUCTURED CONVERSATION SUMMARIZATION

(71) Applicant: Salesforce, Inc., San Francisco, CA (US)

(72) Inventors: Victor Yee, Oakland, CA (US); Chien-Sheng Wu, Mountain View, CA (US); Na Cheng, Yarrow Point, WA (US); Alexander R. Fabbri, New York, NY (US); Zachary Alexander, Berkeley, CA (US); Nicholas Feinig, San Francisco, CA (US); Sameer Abhinkar, San Francisco, CA (US); Shashank Harinath, Mountain View, CA (US); Sitaram Asur, Newark, CA (US); Jacob Nathaniel Huffman, San Francisco, CA (US); Wojciech Kryscinski, Palo Alto, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 321 days.

(21) Appl. No.: 18/156,043

(22) Filed: Jan. 18, 2023

(65) Prior Publication Data
US 2024/0242022 A1  Jul. 18, 2024

(51) Int. Cl.
*G06F 40/174* (2020.01)
*G06F 16/34* (2025.01)

(52) U.S. Cl.
CPC .......... *G06F 40/174* (2020.01); *G06F 16/345* (2019.01)

(58) Field of Classification Search
CPC .................................................. G06F 16/345
See application file for complete search history.

(56) References Cited

U.S. PATENT DOCUMENTS

| | | | |
|---|---|---|---|
| 10,803,399 B1* | 10/2020 | Cohen | G06F 16/93 |
| 11,646,032 B2* | 5/2023 | Balasubramaniam | G10L 15/26 704/232 |
| 11,823,666 B2* | 11/2023 | Lavi | G06F 40/216 |
| 12,014,144 B2* | 6/2024 | Fan | G06F 16/38 |
| 2015/0162020 A1* | 6/2015 | Deshmukh | G10L 15/02 704/235 |
| 2018/0260873 A1* | 9/2018 | Chandramouli | G06Q 30/0625 |

(Continued)

OTHER PUBLICATIONS

Biswas et al. "Extractive Summarization of Call Transcripts". IEEE Access, vol. 10, 2022 (Year: 2022).*

(Continued)

*Primary Examiner* — Jesse S Pullias
(74) *Attorney, Agent, or Firm* — Haynes and Boone, LLP

(57) ABSTRACT

Embodiments described herein provide a structured conversation summarization framework. A user interface may be provided which allows an agent to perform a conversation with a customer, for example regarding resolving a customer support issue. Utterances by both the agent and customer may be stored, and at the end of the conversation, the utterances may be used to generate a structured summary. The structured summary may include components such as a general summary, an issue summary, and a resolution summary. Using neural network models and heuristics, each component of the summary may be automatically generated.

18 Claims, 7 Drawing Sheets

(56) References Cited

U.S. PATENT DOCUMENTS

| | | | | |
|---|---|---|---|---|
| 2020/0195779 A1* | 6/2020 | Weisman | ............... | G06N 5/01 |
| 2020/0250277 A1* | 8/2020 | Mallette | ............... | G06F 40/35 |
| 2020/0349614 A1* | 11/2020 | Batcha | ............... | G10L 15/26 |
| 2022/0261545 A1* | 8/2022 | Lauber | ............... | G06F 40/216 |
| 2023/0360640 A1* | 11/2023 | Asi | ............... | G06F 40/35 |

OTHER PUBLICATIONS

Seungone Kim, Se June Joo, Hyungjoo Chae, Chaehyeong Kim, Seung-won Hwang, Jinyoung Yeo, Mind the Gap! Injecting Commonsense Knowledge for Abstractive Dialogue Summarization, Proceedings of the 29th International Conference on Computational Linguistics, 2022.

Yuejie Lei, Fujia Zheng, Yuanmeng Yan, Keqing He, Weiran Xu, A Finer-grain Universal Dialogue Semantic Structures based Model For Abstractive Dialogue Summarization, Findings of the Association for Computational Linguistics: EMNLP 2021.

* cited by examiner

550

Chat Transcript Details

Chat Transcript Name
000000029

Request Time
6/6/2022, 2:19PM

Status
In Progress

Owner
Agent

514

Case Wrap-Up

⊠ Einstein Recommendations Applied

Customer Name
Chloe Zhang

Account Number
F5KCD5QPAW

Keywords
extension, payment, subscription

Issue Resolved
☐

Order Number
6820094438

Priority
Medium

Escalated
☐

516

Contact Reason
I want an extension for my shopping service.
518

Resolution
I can only extend your payment by one day. Your extension is now reflected on your account.
520

Summary
Customer inquired about postponing their subscription service. Agent verified customer name and account details. Agent verified Silver membership and extended the payment deadline by one day.
522

FIG. 5B

SYSTEMS AND METHODS FOR STRUCTURED CONVERSATION SUMMARIZATION

TECHNICAL FIELD

The embodiments relate generally to natural language processing and machine learning systems, and more specifically to systems and methods for structured conversation summarization.

BACKGROUND

Artificial intelligence (AI) based customer service representatives have been widely used in conducting service conversation with human users, e.g., to collect user information, to address user inquiries in customer service, and/or the like. However, such intelligent agents often generate a large amount of text dialogues. Parsing the dialogue information for service logging and further analytics remains labor intensive and costly. A general summarization tool may produce a summary of the conversation, i.e., by treating the conversation text as an input document. However, such generic summary barely captures the apparent context of a two-way text conversation used for a specific purpose, e.g., to fix a technical problem for a user in IT service, etc. Therefore, there is a need for improved systems and methods for conversation summarization in the context of a service bot.

BRIEF DESCRIPTION OF THE DRAWINGS

FIGS. 5A-5B illustrate exemplary user interfaces, according to some embodiments.

Figure 1:
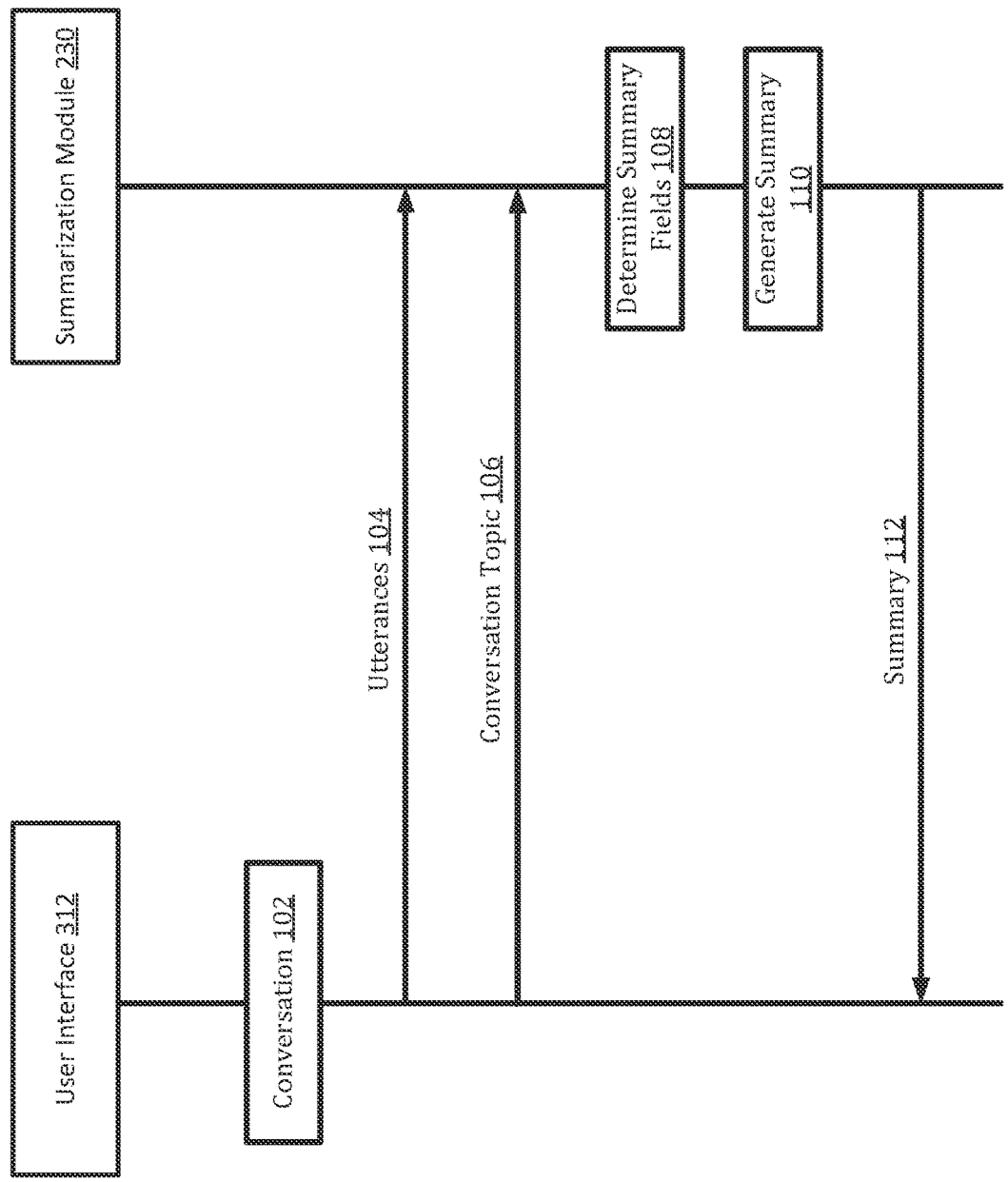
FIG. 1 is a simplified diagram illustrating a structured conversation summarization framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Artificial intelligence (AI) based customer service representatives have been widely used in conducting service conversation with human users, e.g., to collect user information, to address user inquiries in customer service, and/or the like. However, such intelligent agents often generate a large amount of text dialogues. Parsing the dialogue information for service logging and further analytics remains labor intensive and costly. A general summarization tool may produce a summary of the conversation, i.e., by treating the conversation text as an input document. However, such generic summary barely captures the apparent context of a two-way text conversation used for a specific purpose, e.g., to fix a technical problem for a user in IT service, etc. Therefore, there is a need for improved systems and methods for conversation summarization in the context of a service bot.

In view of the need for improved conversation summarization that reflects the context and/or the specific purpose of a conversation, embodiments described herein provide a structured summarization tool that generates a structured summary of human-agent conversations. The structured summary takes the form of a plurality of data fields including user information, date and time, an issue summary and a resolution summary of a particular human-agent dialogue session, and may be presented to a user as an engageable user interface element. Specifically, to generate the issue and/or resolution summary, a natural language processing (NLP) summarization model may be adopted. First, a generic summary may be generated based on an input text of the human-agent dialogue script. The generated summary is then compared with each user utterance from the dialogue to generate a respective similarity metric. A portion of user utterances (e.g., first half as a user is more likely to describe the problem at an earlier stage of the dialogue) is ranked based on respective similarity metrics, with the highest ranked utterances being identified as the issue summary. Similarly, the latter half of utterances (e.g., as the latter half of the dialog is more likely to focus on providing a solution to the issue/problem the user has described in the first half of the dialog) are ranked to provide the resolution summary.

Embodiments described herein provide a number of benefits. For example, by utilizing the summarization model, the burden summaries may be automatically generated rather than relying on human input. Fewer memory and/or compute resources may be required by reducing the utterances which are considered in aspects of the summarization. By dividing the summary into categories, each portion of the summary may more efficiently be generated as opposed to an unstructured summary. With the structured summary format, indexing, logging and searching issues or solutions may be more efficient. The structured summary data may also be used as annotated training data to further fine-tune a summarization model to generate summaries of conversations that has an issue-solution theme.

Overview

FIG. 1 is a simplified diagram illustrating a structured conversation summarization framework according to some embodiments. The framework comprises a user interface 312, which may be presented on a user device such as user device 310 in FIG. 3. User interface 312 is operatively connected to a summarization module 230 (as described further in FIG. 2).

User Interface 312 is used to conduct a conversation 102. For example, a customer support agent (and/or an automated agent) may use user interface 312 to converse with a human user using another system in order to resolve a customer issue. At the end of the conversation, user interface 312 may transmit utterances 104 (which may include utterances by a user and responses by an agent) to summarization module 230. The utterances 104 may be in their original form, or may be processed into a representation of the original utterances (e.g., a vector representation). Other preprocessing which may be performed at either user interface 312 or summarization module 230 may include concatenating the utterances together to generate an input sequence of tokens.

User interface 312 may also transmit a conversation topic 106 to summarization module 230. The conversation topic 106 may be manually selected by a user, or determined by a trained model based on the conversation 102. Based on the conversation topic 106, summarization module 230 may determine a structured summary form. For example, the structured summary form may be obtained by querying a summary form database based on the conversation topic 106. User interface 312 may directly indicate to summarization module 230 the structured summary form. In some embodiments, conversation topic 106 or the structured summary form may include a field indicating whether the customer issue discussed in conversation 102 was resolved. The indication on whether the issue was resolved may be manually selected by a user, or may be generated by a prediction model trained on a dataset of dialogue data and annotated resolution results.

At action 108, summarization module 230 determines summary fields based on the determined structured summary form. Summary fields may include, for example, and "issue summary" field, a "resolution summary" field, and/or a "general summary" field. At action 110, summarization module 230 generates the summary which may include multiple individual summaries according to the determined summary fields. For example, an issue summary, a resolution summary, and a general summary may all be generated. At action 112, the summary may be communicated back to user interface 312 so that it may be displayed to a user, and/or stored in memory for later use.

Specifically, a general summary may be generated by a summarization model which uses the received utterances 104 as an input. As described above, utterances 104 may first be preprocessed by concatenating each utterance and response and generating a series of input tokens for the model. The summarization model may be a pretrained neural network based model which provides output tokens representing the generated summary.

If an issue summary field is in the structured summary form, then an issue summary may be generated by summarization module 230. To generate an issue summary, first the summarization module 230 may filter utterances 104 to include only the most relevant utterances. Generally, the customer will state the issue, so utterances 104 may be filtered to include only utterances which were input by the customer. Since the issue is generally stated at the beginning of conversation 102, the utterances may be further filtered to include the first utterances occurring in time order (e.g., the first half of the utterances). After filtering the utterances, the filtered utterances may be encoded, via a sentence transformer model, into a set of utterance representations. The generated general summary may also be encoded via a sentence transformer model. The sentence whose representation is the most similar (e.g., highest cosine similarity) to the general summary representation may be selected as the issue summary. In some embodiments, the unchanged selected utterance may be used as the issue summary. In other embodiments, the selected utterance may be modified by a neural network model to put it into a form which is better suited as a summary rather than a conversational utterance.

If a resolution summary field is in the structured summary form, then a resolution summary may be generated by summarization module 230. To generate a resolution summary, first the utterances 104 may be filtered to include the most relevant utterances to the resolution. Generally, the resolution is stated by the agent, so only agent responses may be included. Further, the resolution is generally stated towards the end of a conversation 102, so the utterances may be filtered to only include the later in time utterances (e.g., the second half of the utterances 104). Finally, the resolution is generally a lengthier utterance as it includes details of how to resolve the issue. In some embodiments, the lengthiest of the filtered utterances is selected as the resolution summary. In some embodiments, the unchanged selected utterance may be used as the resolution summary. In other embodiments, the selected utterance may be modified by a neural network model to put it into a form which is better suited as a summary rather than a conversational utterance. Additional heuristics may be used to determine a resolution response based on past responses. For example, based on past resolution summaries, it may be determined that the second to last agent utterance is generally the resolution, and that may be used in determining which utterance to select as the resolution summary.

Computer and Network Environment

Figure 2:
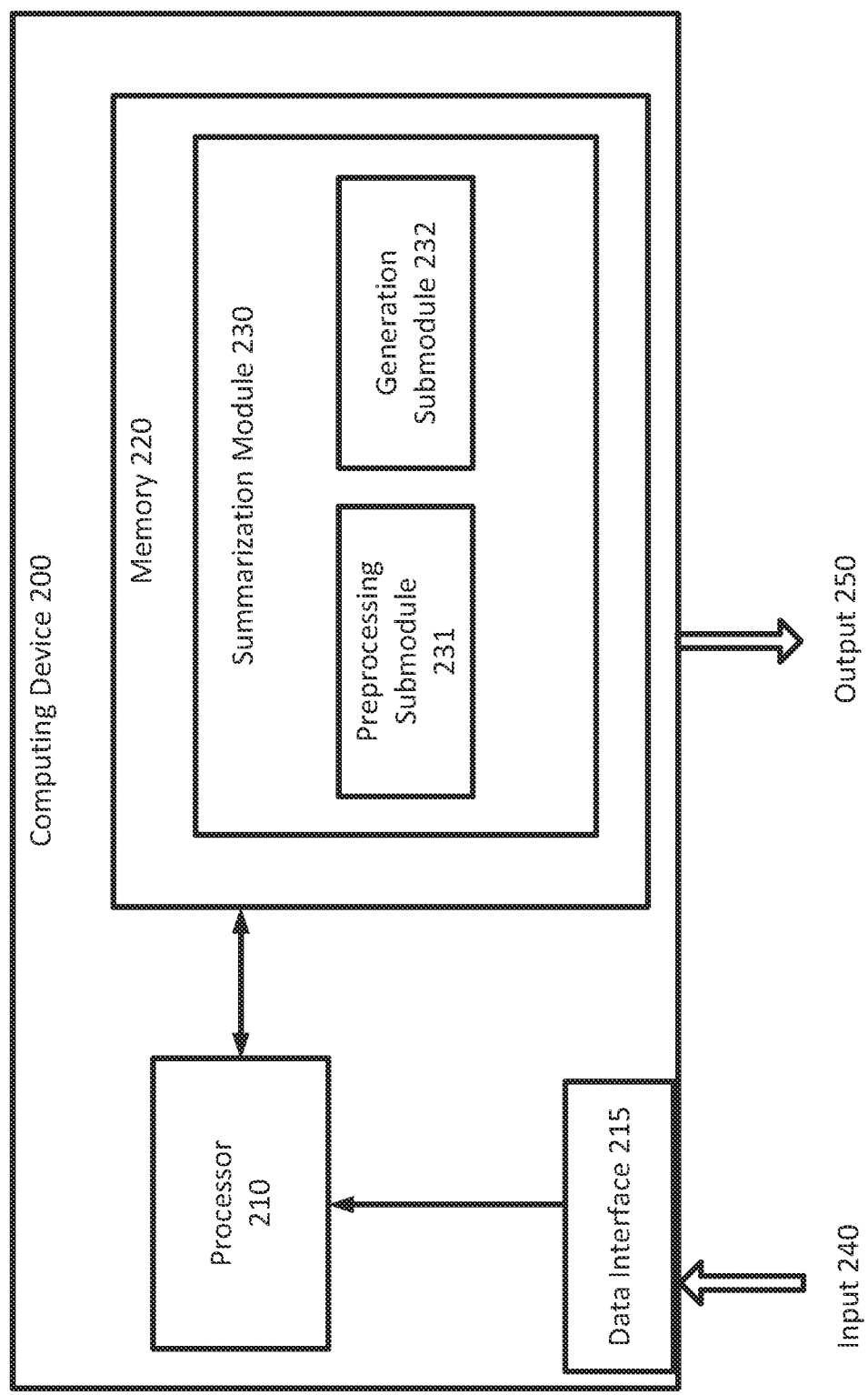
FIG. 2 is a simplified diagram illustrating a computing device implementing the structured conversation summarization framework, according to one embodiment described herein.

FIG. 2 is a simplified diagram illustrating a computing device implementing the structured conversation summarization framework, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for summarization module 230 that may be used to implement and/or emulate the systems and models, and/or to implement any of the methods described further herein, summarization module 230 may receive input 240 such as an input training data (e.g., conversations and/or reference summaries) via the data interface 215 and generate an output 250 which may be a structured summary.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as conversation utterances and/or a conversation topic, from a user via the user interface.

In some embodiments, the summarization module 230 is configured to generate a structured summary based on a conversation. The summarization module 230 may further include preprocessing submodule 231 and generation submodule 232. Preprocessing submodule 231 may perform a number of actions related to the structured conversation summarization framework described herein. For example, preprocessing submodule 231 may concatenate conversation utterances together, and convert the utterances into sequences of tokens. Preprocessing submodule 231 may also filter utterances as described above, for example filtered sets of utterances may include utterances in the first or second half of a conversation, or utterances by one of the sides of the conversation (e.g., customer utterances or agent utterances). Generation submodule 232 may perform other functions as described herein. For example, generation submodule may generate a general summary, an issue summary, and a resolution summary based on a conversation and a structured summary form. In one embodiment, the summarization module 230 and its submodules 231-232 may be implemented by hardware, software and/or a combination thereof.

In one embodiment, the summarization module 230 and one or more of its submodules 231-232 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 220 as a structure of layers of neurons, and parameters describing the non-linear transformation at each neuron and the weights associated with edges connecting the neurons. An example neural network may be a transformer model, and/or the like.

In one embodiment, the neural network based summarization module 230 and one or more of its submodules 231-232 may be trained by updating the underlying parameters of the neural network based on a loss function. For example, a loss that evaluates how far away a neural network model generates a predicted output value from its target output value (also referred to as the "ground-truth" value). Given the loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
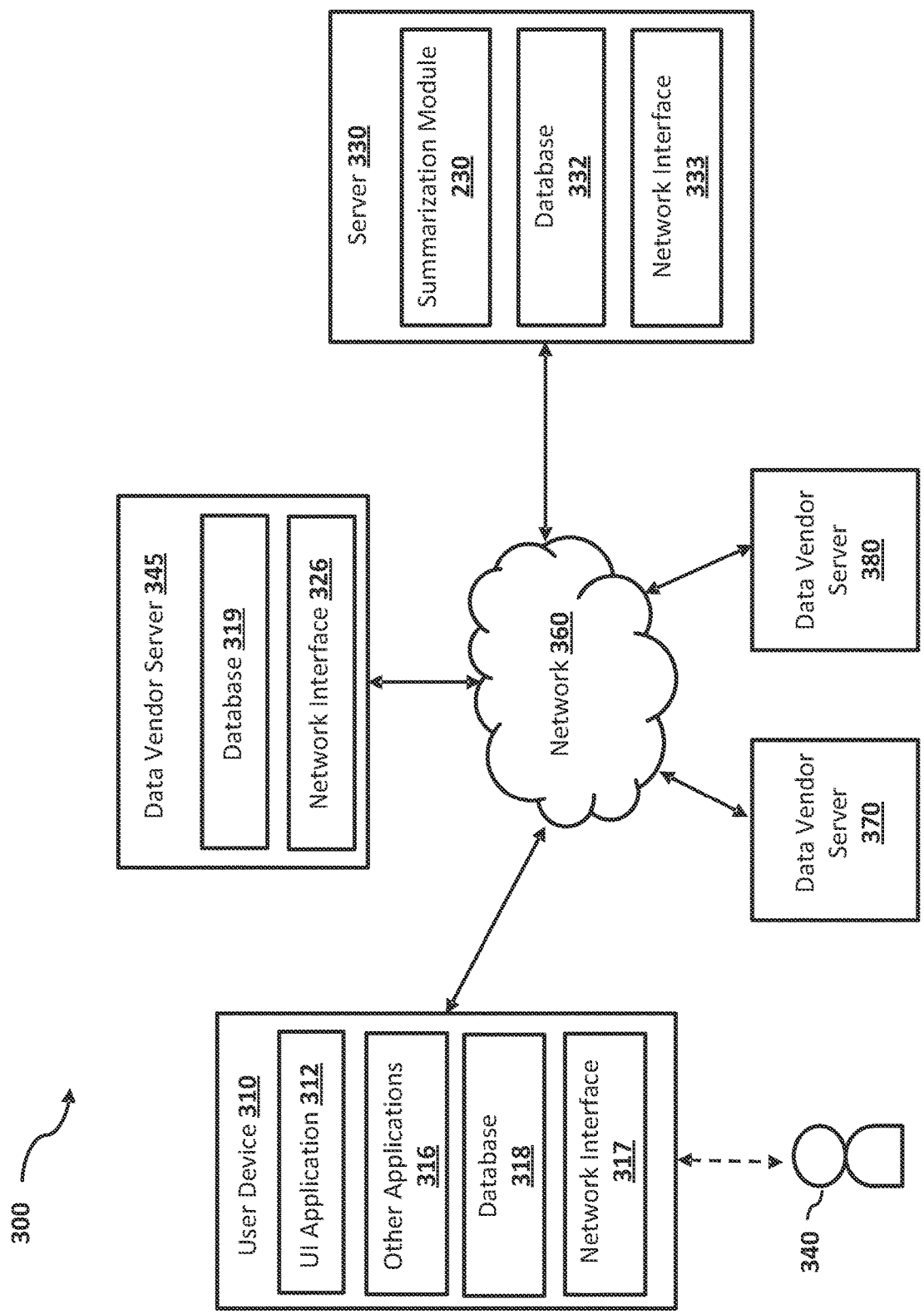
FIG. 3 is a simplified block diagram of a networked system suitable for implementing the structured conversation summarization framework, according to one embodiment described herein.

FIG. 3 is a simplified block diagram of a networked system 300 suitable for implementing the structured conversation summarization framework described in FIGS. 1-2 and other embodiments described herein. In one embodiment, system 300 includes the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a conversation summary from the server 330 and display the summary via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view the generated summary.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including conversations and reference summaries to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the summarization module 230 and its submodules described in FIG. 2. In some implementations, summarization module 230 may receive data from database 319 at the data vendor server 345 via the network 360 to generate summaries. The generated summaries may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the summarization module 230. In one implementation, the database 332 may store previously generated summaries, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Figure 4:
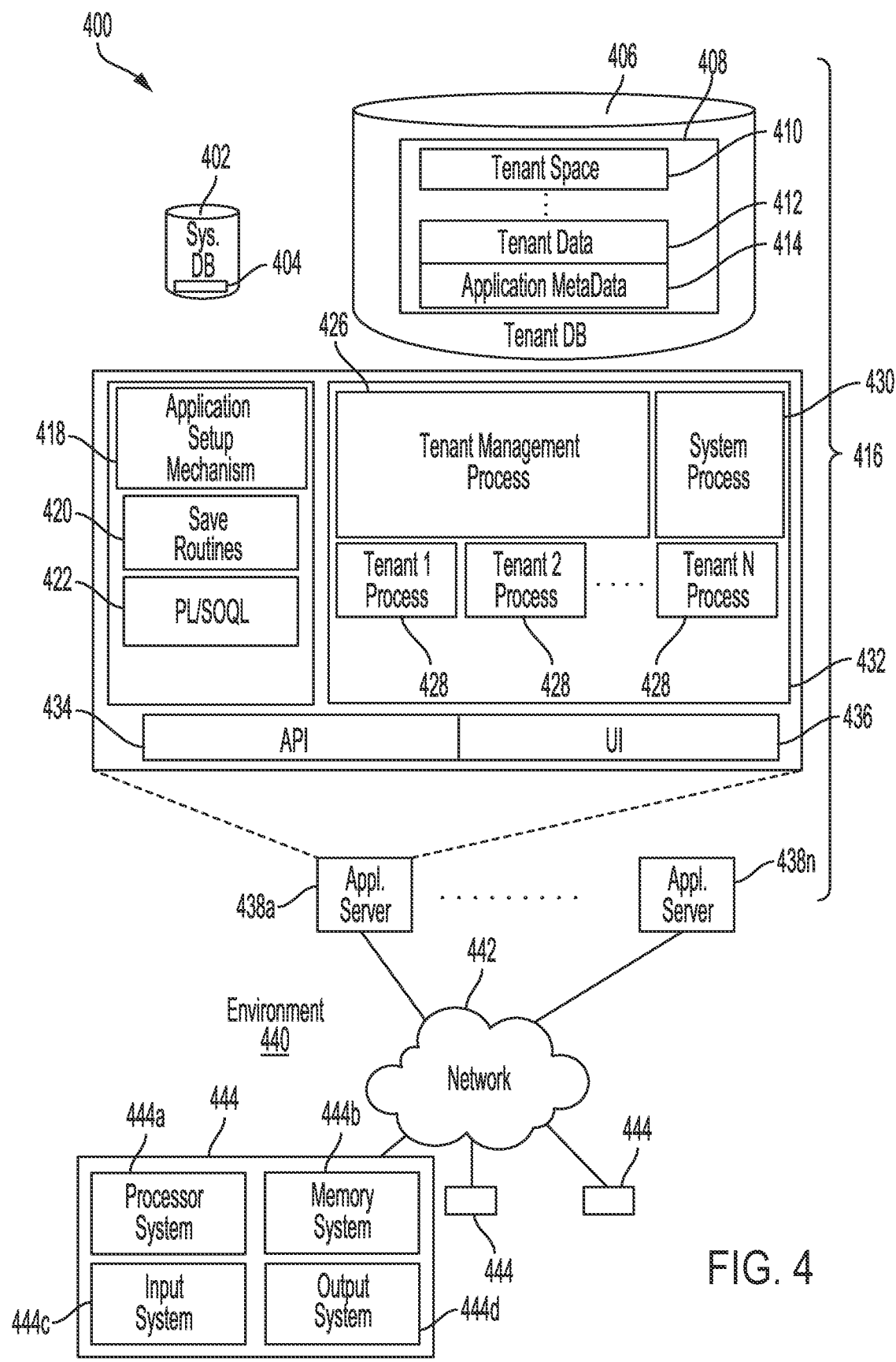
FIG. 4 illustrates a block diagram of an example environment wherein systems and methods for structured conversation summarization may be provided and used according to some embodiments.

FIG. 4 illustrates the environment 440, which may be used to implement embodiments described herein. FIG. 4 illustrates elements of system 416 and various interconnections, according to some embodiments. FIG. 4 shows that each of the user systems 444 may include a processor system 444a, a memory system 444b, an input system 444c, and an output system 444d FIG. 4 shows the network 442 and the system 416. FIG. 4 also shows that the system 416 may include the tenant data storage 406, the tenant data 408, the system data storage 402, the system data 404, a user interface (UI) 436, an application program interface (API) 434, a PL/Salesforce.com object query language (PL/SOQL) 422, save routines 420, an application setup mechanism 418, applications servers 438a-438n, a system process space 430, tenant process spaces 428, a tenant management process space 426, a tenant storage area 410, a user storage 412, and application metadata 414. In other embodiments, environment 440 may not have the same elements as those listed above and/or may have other elements instead of, or in addition to, those listed above.

A user system 444 may be any machine or system that is used by a user to access a database user system. For example, any of user systems 444 can be a handheld computing device, a mobile phone, a laptop computer, a notepad computer, a work station, and/or a network of computing devices. User systems 444 might interact via a network 442 with an on-demand database service, which is system 416.

The network 442 is any network or combination of networks of devices that communicate with one another. For example, the network 442 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 444 might communicate with system 416 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 444 might include an HTTP client commonly referred to as a "browser" for sending and receiving HTTP messages to and from an HTTP server at system 416. Such an HTTP server might be implemented as the sole network interface between system 416 and network 442, but other techniques might be used as well or instead. In some implementations, the interface between system 416 and network 442 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 416 implements a web-based customer relationship management (CRM) system. For example, in one embodiment, system 416 includes application servers configured to implement and execute CRM software applications as well as provide related data, code, forms, webpages and other information to and from user systems 444 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, system 416 may provide tenant access to multiple hosted (standard and custom) applications, including a CRM application. User (or third-party developer) applications, which may or may not include CRM, may be supported by the application platform 424, which manages creation, storage of the applications into one or more database objects, and executing of the applications in a virtual machine in the process space of the system 416.

Regarding the user systems 444, the processor system 444a may be any combination of one or more processors. The memory system 444b may be any combination of one or more memory devices, short-term, and/or long-term memory. The input system 444c may be any combination of input devices, such as one or more keyboards, mice, trackballs, scanners, cameras, and/or interfaces to networks. The output system 444d may be any combination of output devices, such as one or more monitors, printers, and/or interfaces to networks. The system 416 may include the network interface implemented as a set of HTTP application servers 438, the application platform 424, the tenant data storage 406, and the system data storage 402. Also shown is system process space 430, including individual tenant process spaces 428 and the tenant management process space 426. Each application server 438 may be configured to access tenant data storage 406 and the tenant data 408 therein, and the system data storage 402 and the system data 404 therein to serve requests of the user systems 444. The tenant data 408 might be divided into individual tenant storage areas 410, which can be either a physical arrangement and/or a logical arrangement of data. Within each tenant storage area 410, the user storage 412 and the application metadata 414 might be similarly allocated for each user. For example, a copy of a user's most recently used (MRU) items might be stored to the user storage 412. Similarly, a copy of MRU items for an entire organization that is a tenant might be stored to the tenant storage area 410. The UI 436 provides a user interface and the API 434 provides an application programmer interface to the system 416 resident processes and to users and/or developers at the user systems 444. The tenant data and the system data may be stored in various databases, such as one or more Oracle™ databases.

The application platform 424 includes an application setup mechanism 418 that supports application developers' creation and management of applications, which may be saved as metadata into tenant data storage 406 by the save routines 420 for execution by subscribers as one or more tenant process spaces 428 managed by the tenant management process space 426, for example. Invocations to such applications may be coded using PL/SOQL 422 that provides a programming language style interface extension to the API 434. Some embodiments of PL/SOQL language are discussed in further detail in U.S. Pat. No. 7,730,478, filed Sep. 21, 4387, entitled, "Method and System For Allowing Access to Developed Applications Via a Multi-Tenant On-Demand Database Service," which is incorporated herein by reference. Invocations to applications may be detected by one or more system processes, which manage retrieving the application metadata 414 for the subscriber, making the invocation and executing the metadata as an application in a virtual machine.

Each application server 438 may be communicably coupled to database systems, e.g., having access to the system data 404 and the tenant data 408, via a different network connection. For example, one application server 438a might be coupled via the network 442 (e.g., the Internet), another application server 438n-1 might be coupled via a direct network link, and another application server 438n might be coupled by yet a different network connection. Transfer Control Protocol and Internet Protocol (TCP/IP) are typical protocols for communicating between application servers 438 and the database system. However, it will be apparent to one skilled in the art that other transport protocols may be used to optimize the system depending on the network connection used.

In certain embodiments, each application server 438 is configured to handle requests for any user associated with any organization that is a tenant. Because it is desirable to be able to add and remove application servers from the server pool at any time for any reason, there is preferably no server affinity for a user and/or organization to a specific application server 438. In one embodiment, therefore, an interface system implementing a load balancing function (e.g., an F5 Big-IP load balancer) is communicably coupled between the application servers 438 and the user systems 444 to distribute requests to the application servers 438. In one embodiment, the load balancer uses a least connections algorithm to route user requests to the application servers 438. Other examples of load balancing algorithms, such as round robin and observed response time, also can be used. For example, in certain embodiments, three consecutive requests from the same user could hit three different application servers 438, and three requests from different users could hit the same application server 438. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage his or her sales process. Thus, a user might maintain contact data, leads data, customer follow-up data, performance data, goals and progress data, etc., all applicable to that user's personal sales process (e.g., in the tenant data storage 406). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 444 (which may be client systems) communicate with the application servers 438 to request and update system-level and tenant-level data from the system 416 that may require sending one or more queries to the tenant data storage 406 and/or the system data storage 402. The system 416 (e.g., an application server 438 in the system 416) automatically generates one or more structured query language (SQL) statements (e.g., one or more SQL queries) that are designed to access the desired information. The system data storage 402 may generate query plans to access the requested data from the database.

In a database system, such as system 416, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing a structured conversation summarization framework that utilizes a pipeline of algorithmic approaches, machine learning processes, and/or neural networks to summarize conversations, the CRM database may include one or more tables representing conversation data and resulting summaries. The conversation data may include customer conversations and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. In certain embodiments, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 416 described above may be accessed and used by a number of customers, clients, or other persons (generally, "users") regarding conversation summarization. To facilitate interaction between the database system 416 and the user, a search bar, voice interface, data upload process, or similar user interface tool is provided. The interface tool allows a user to submit conversations requiring summarization through the framework provided herein. The interface tool further allows a user to see the resulting summaries, and provide feedback on the resulting summaries.

For neural networks providing conversation summarization, large amounts of annotated data may be required to receive good summarization results. For example, tens of thousands or more annotated conversations having known-good summaries to generate a summary. Thus, a customer of the CRM system may provide training conversations and summaries. This introduces human error into the process of annotating data. Furthermore, a database system may require large amounts of resources to store different sets of conversation data. In a multi-tenant system, such as Salesforce.com, a customer may be required to utilize a large amount of resources to train a neural network for conversation summarization. Continuing with the example, because the customer may be interested in quickly training a neural network without using valuable manpower and database resources, it may be desirable or preferable that the unannotated conversation data is annotated using an automated framework that requires no or minimal user input to generate reference summary information and other annotations in unlabeled or unannotated conversation data. As such, according to some embodiments, systems and methods are provided for generating annotated data for conversation summarization neural networks.

As shown in FIG. 4, the multi-tenant system 400 supports access to the platform from multiple tenants (users). Multiple human users may interact with an intelligent service bot to each generate a conversation transcript. The multi-tenant system 400 supports the generation of the conversation summary shown in FIGS. 5A-5B for multiple users concurrently, or on an on-demand basis.

Figure 5A:
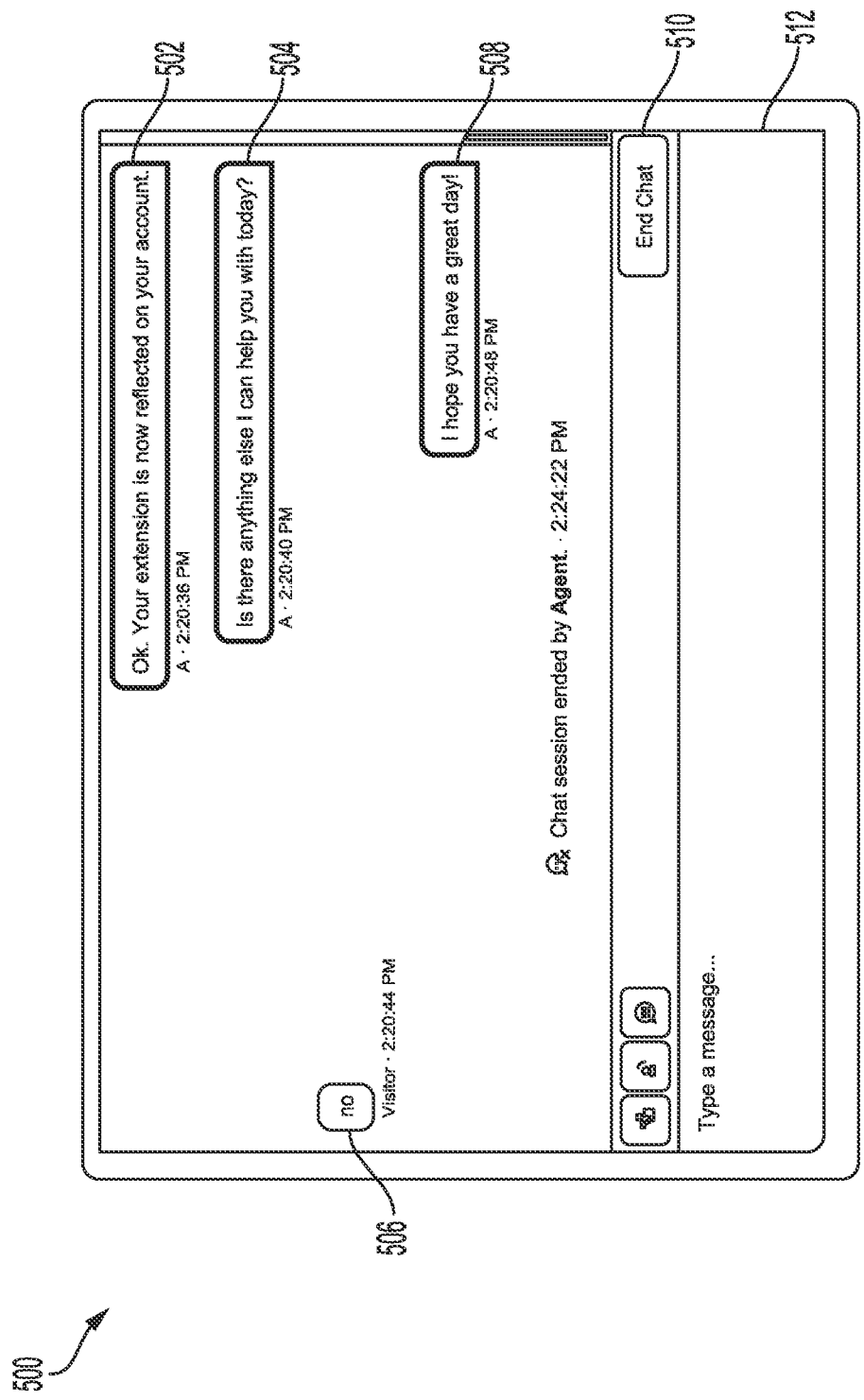

FIGS. 5A-5B illustrate exemplary user interfaces 500 and 550 according to some embodiments. User interfaces may be part of UI application 312 of FIG. 3. User interface 500 is an interface for performing conversations, for example between an agent and a customer. Utterances by the agent may be displayed, for example illustrated utterances 502, 504, and 508. Customer utterances may also be displayed, for example illustrated utterance 506. Other icons may be displayed which an agent may use to control the user interface, such as an end chat button 510 which may be used to end the conversation (chat). As illustrated, a text input box may be provided where the agent may input responses for the customer. In some embodiments, the summarization methods described herein are performed in response to the agent clicking the end chat button 510.

User interface 550 in FIG. 5B illustrates chat transcript details 514 and case wrap-up information 516. Chat transcript details 514 may display information such as an ID for the chat transcript, a status indication, a time-stamp for the conversation, and an indication of an owner of the chat transcript. The case wrap-up 516 may include additional information which is stored associated with a case for later reference. Information may include a customer name, order number, account number, priority level, associated keywords, and indication of whether the issue was escalated, and/or an indication of whether the issue was resolved. In some embodiments, the indication of whether the issue was resolved may be selected automatically based on a determination by a model using the conversation as an input.

Case wrap-up 516 may also include a structured summary of the conversation which may include an issue summary 518, resolution summary 520, and/or a general summary 522. Each of these summaries may be automatically populated as generated by the methods described herein. In some embodiments, a user may modify the automatically generated summary. The modification may further be used as training data to fine-tune the model used in generating the summary. The specific summary fields presented may be based on the conversation topic, which may be determined by a model based on the conversation, or may be indicated by a user/agent.

In some implementation, the screens 500 and 550 may be displayed side by side to a human user (e.g., a system administrator, a helpdesk consultant, and/or the like) within the same user interface. In this way, the human user may review the actual conversation transcript and the case wrap-up summary together.

In one implementation, the generated issue summary 518, resolution summary 520, summary 522 and the original conversation transcript may be used to form a training dataset for training the summarization model.

Example Work Flows

Figure 6:
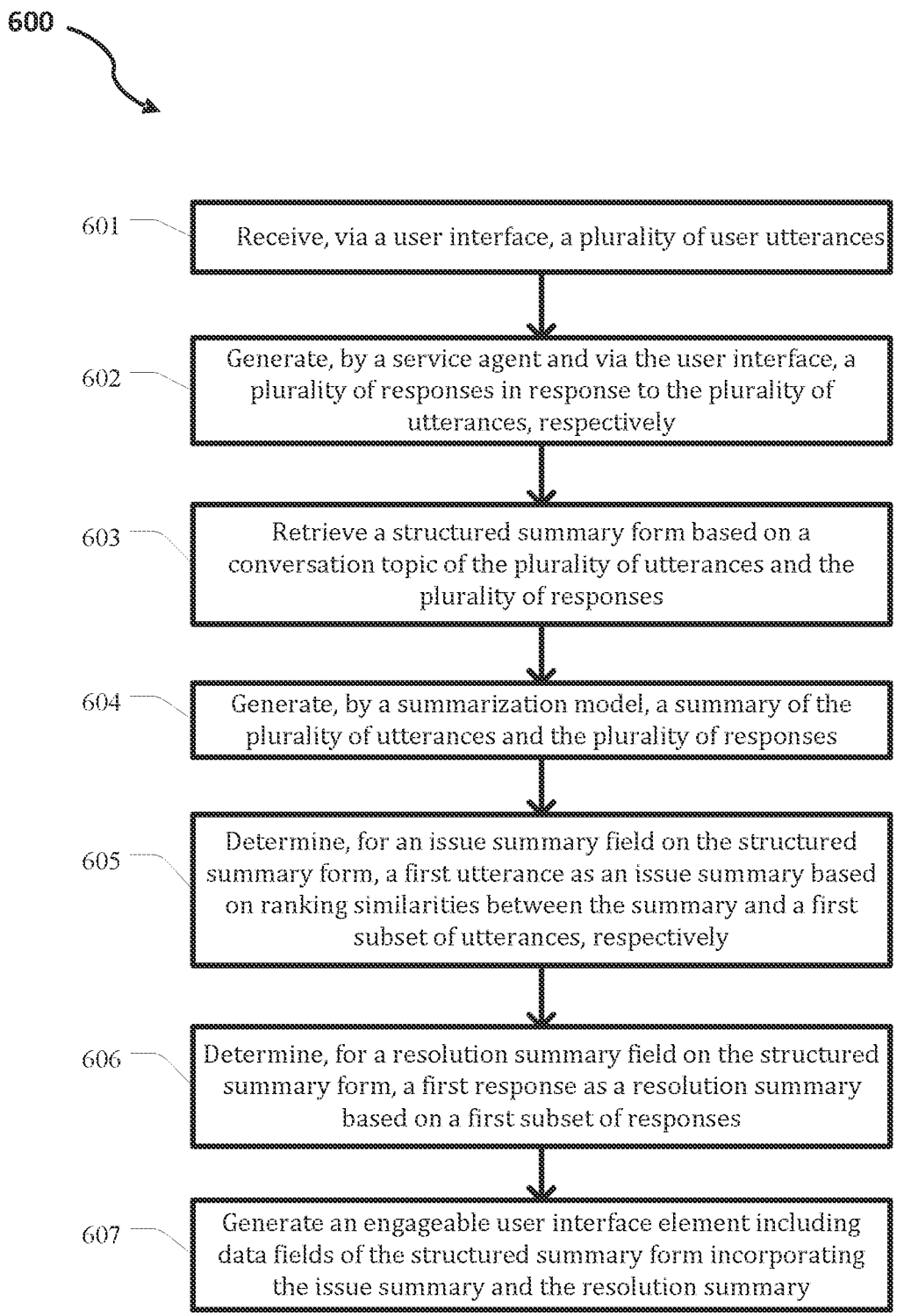
FIG. 6 is a simplified logic flow diagram illustrating a method of structured conversation summarization, according to some embodiments.

FIG. 6 is an example logic flow diagram illustrating a method of structured conversation summarization based on the framework shown in FIGS. 1-5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the summarization module 230 (e.g., FIGS. 2-3) that performs structured conversation summarization.

As illustrated, the method 600 includes a number of enumerated steps, but aspects of the method 600 may include additional steps before, after, and in between the enumerated steps. In some aspects, one or more of the enumerated steps may be omitted or performed in a different order.

At step 601, a system receives, via a user interface, a plurality of user utterances. For example, utterances received from a customer requesting assistance.

At step 602, the system generates, by a service agent and via the user interface, a plurality of responses in response to the plurality of utterances, respectively. The service agent may be a person who inputs responses via the user interface and/or the responses may be automated by the system.

At step 603, the system retrieves a structured summary form based on a conversation topic of the plurality of utterances and the plurality of responses. For example, the structured summary form may be obtained by querying a summary form database based on the conversation topic. The conversation topic may be inferred from the conversation utterances, or may be manually input into the user interface by a user, e.g., conversation topic may be indicated as "request a refund," "report computer issue," "report fraud," and/or the like. In some embodiments, the structured summary form is selected directly, e.g., based on keywords extracted from the conversation transcript. In some embodiments, the conversation topic or the structured summary form may include a field indicating whether the customer issue discussed in conversation was resolved.

In one implementation, the indication on whether the issue was resolved may be manually selected by a user, or may be generated by a prediction model trained on a dataset of dialogue data and annotated resolution results.

At step 604, the system generates, by a summarization model, a summary of the plurality of utterances and the plurality of responses. The summarization model may use the utterances directly, or some preprocessing may be performed by the system on the utterances before they are input to the summarization model. For example, the utterances (both user utterances and agent responses) may be concatenated together, and converted to a sequence of tokens. The summary generated at this step may be a general summary which describes generally the contents of the conversation. The summarization model may be a pretrained neural network based natural language processing model which provides output tokens representing the generated summary.

At step 605, the system determines, for an issue summary field on the structured summary form, a first utterance as an issue summary based on ranking similarities between the summary and a first subset of utterances, respectively. Specifically, if an issue summary field is in the structured summary form, then an issue summary may be generated by the system. To generate an issue summary, the system may filter utterances to include only the most relevant utterances. Generally, the customer will state the issue, so utterances may be filtered to include only utterances which were input by the customer. Since the issue is generally stated at the beginning of a conversation, the utterances may be further filtered to include the first utterances occurring in time order (e.g., the first half of the utterances). After filtering the utterances, the filtered utterances may be encoded, via a sentence transformer model, into a set of utterance representations. The generated general summary may also be encoded via a sentence transformer model. The sentence whose representation is the most similar (e.g., highest cosine similarity) to the general summary representation may be selected as the issue summary. In some embodiments, the unchanged selected utterance may be used as the issue summary. In other embodiments, the selected utterance may be modified by a neural network model to put it into a form which is better suited as a summary rather than a conversational utterance.

At step 606, the system determines, for a resolution summary field on the structured summary form, a first response as a resolution summary based on a first subset of responses. Specifically, if a resolution summary field is in the structured summary form, then a resolution summary may be generated by the system. To generate a resolution summary, first the utterances may be filtered to include the most relevant utterances to the resolution. For example, the resolution is stated by the agent, so only agent responses may be included. In other implementations, the user utterances may also be included. Further, the resolution is generally stated towards the end of a conversation, so the utterances may be filtered to only include the later in time utterances (e.g., the second half of the utterances). Finally, the resolution is generally a lengthier utterance as it includes details of how to resolve the issue. In some embodiments, the lengthiest of the filtered utterances is selected as the resolution summary. In some embodiments, the unchanged selected utterance may be used as the resolution summary. In other embodiments, the selected utterance may be modified by a neural network model to put it into a form which is better suited as a summary rather than a conversational utterance. Additional heuristics may be used to determine a resolution response based on past responses. For example, based on past resolution summaries, it may be determined that the second to last agent utterance is generally the resolution, and that may be used in determining which utterance to select as the resolution summary.

In another implementation, the resolution summary is determined by a language model that is trained on a dataset of dialogue data and annotated resolution summaries. For example, the system responses from the latter half of the conversation may be input to the language model to generate a resolution summary.

At step 607, the system generates an engageable user interface element including data fields of the structured summary form incorporating the issue summary and the resolution summary. The user interface element may be displayed on the display of a user device, for example as illustrated in FIG. 5B.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of structured summarization of user-agent interactions on a service platform, the method comprising:
   receiving, via a user interface, a plurality of user utterances;
   generating, by a service agent and via the user interface, a plurality of responses in response to the plurality of user utterances, respectively;
   retrieving a structured summary form based on a conversation topic of the plurality of user utterances and the plurality of responses;

generating, by a summarization model trained on a dataset of dialogue data and annotated reference summaries, a summary of the plurality of user utterances and the plurality of responses;

determining, for an issue summary field on the structured summary form, a first utterance selected from the plurality of user utterances as an issue summary based on ranking similarities between the summary and a subset of user utterances selected from the plurality of user utterances, respectively;

determining, for a resolution summary field on the structured summary form, a first response selected from the plurality of responses as a resolution summary based on a subset of responses selected from the plurality of responses; and generating an engageable user interface element including data fields of the structured summary form incorporating the issue summary and the resolution summary.

2. The method of claim 1, wherein retrieving the structured summary form comprises:
obtaining a user selected conversation topic through the user interface; and
querying a summary form database based on the user selected conversation topic.

3. The method of claim 1, wherein generating, by the summarization model, the summary comprises:
concatenating the plurality of user utterances and the plurality of responses into an input sequence of tokens; and
generating, by the summarization model, the summary based on the input sequence of tokens.

4. The method of claim 1, wherein determining the first utterance as the issue summary comprises:
filtering the plurality of user utterances based on relevance into the subset of user utterances;
encoding, via a sentence Transformer model, the subset of user utterances into a first plurality of utterance representations;
encoding, via the sentence Transformer model, the summary into a summary representation;
computing a set of cosine similarities between the summary representation and the first plurality of utterance representations, respectively; and
selecting the first utterance corresponding to a greatest cosine similarity with the summary representation.

5. The method of claim 4, further comprising:
generating, via the summarization model, the issue summary based on the first utterance.

6. The method of claim 1, wherein determining the first response as the resolution summary comprises:
selecting the first response from the subset of responses based on lengths of responses and heuristics of past responses.

7. The method of claim 1, wherein the subset of responses comprise a second half of the plurality of responses in time.

8. The method of claim 1, wherein the structured summary form further comprises a field indicating whether an issue discussed during the user-agent interactions has been resolved, and wherein the field is generated using a prediction model trained on a dataset of dialogue data and annotated resolution results.

9. A system for structured summarization of user-agent interactions on a service platform, the system comprising:
a memory that stores a summarization model trained on a dataset of dialogue data and annotated reference summaries and a plurality of processor-executable instructions;

a communication interface that receives a plurality of user utterances; and
one or more hardware processors that read and execute the plurality of processor-executable instructions from the memory to perform operations comprising:
generating, via the communication interface, a plurality of responses in response to the plurality of user utterances, respectively;
retrieving a structured summary form based on a conversation topic of the plurality of user utterances and the plurality of responses;
generating, by the summarization model, a summary of the plurality of user utterances and the plurality of responses;
determining, for an issue summary field on the structured summary form, a first utterance selected from the plurality of user utterances as an issue summary based on ranking similarities between the summary and a subset of user utterances selected from the plurality of user utterances, respectively;
determining, for a resolution summary field on the structured summary form, a first response selected from the plurality of responses as a resolution summary based on a subset of responses selected from the plurality of responses; and
generating an engageable user interface element including data fields of the structured summary form incorporating the issue summary and the resolution summary.

10. The system of claim 9, wherein retrieving the structured summary form comprises:
obtaining a user selected conversation topic through the communication interface; and
querying a summary form database based on the user selected conversation topic.

11. The system of claim 9, wherein generating, by the summarization model, the summary comprises:
concatenating the plurality of user utterances and the plurality of responses into an input sequence of tokens; and
generating, by the summarization model, the summary based on the input sequence of tokens.

12. The system of claim 9, wherein determining the first utterance as the issue summary comprises:
filtering the plurality of user utterances based on relevance into the subset of user utterances;
encoding, via a sentence Transformer model, the subset of user utterances into a first plurality of utterance representations;
encoding, via the sentence Transformer model, the summary into a summary representation;
computing a set of cosine similarities between the summary representation and the first plurality of utterance representations, respectively; and
selecting the first utterance corresponding to a greatest cosine similarity with the summary representation.

13. The system of claim 12, the operations further comprising:
generating, via the summarization model, the issue summary based on the first utterance.

14. The system of claim 9, wherein determining the first response as the resolution summary comprises:
selecting the first response from the subset of responses based on lengths of responses and heuristics of past responses.

15. The system of claim 9, wherein the subset of responses comprise a second half of the plurality of responses in time.

16. The system of claim 9, wherein the structured summary form further comprises a field indicating whether an issue discussed during the user-agent interactions has been resolved, and wherein the field is generated using a prediction model trained on a dataset of dialogue data and annotated resolution results.

17. A non-transitory machine-readable medium comprising a plurality of machine-executable instructions which, when executed by one or more processors, are adapted to cause the one or more processors to perform operations comprising:

receiving, via a user interface, a plurality of user utterances;

generating, via the user interface, a plurality of responses in response to the plurality of user utterances, respectively;

retrieving a structured summary form based on a conversation topic of the plurality of user utterances and the plurality of responses;

generating, by a summarization model trained on a dataset of dialogue data and annotated reference summaries, a summary of the plurality of user utterances and the plurality of responses;

determining, for an issue summary field on the structured summary form, a first utterance selected from the plurality of user utterances as an issue summary based on ranking similarities between the summary and a subset of user utterances selected from the plurality of user utterances, respectively;

determining, for a resolution summary field on the structured summary form, a first response selected from the plurality of responses as a resolution summary based on a subset of responses selected from the plurality of responses; and generating an engageable user interface element including data fields of the structured summary form incorporating the issue summary and the resolution summary.

18. The non-transitory machine-readable medium of claim 17, wherein retrieving the structured summary form comprises:

obtaining a user selected conversation topic through the user interface; and querying a summary form database based on the user selected conversation topic.

* * * * *